Nov. 26, 1968     R. E. ROBARGE     3,412,970
RESILIENT INSERT PILOT SEAT AND CONNECTOR
Filed May 16, 1966     2 Sheets-Sheet 1
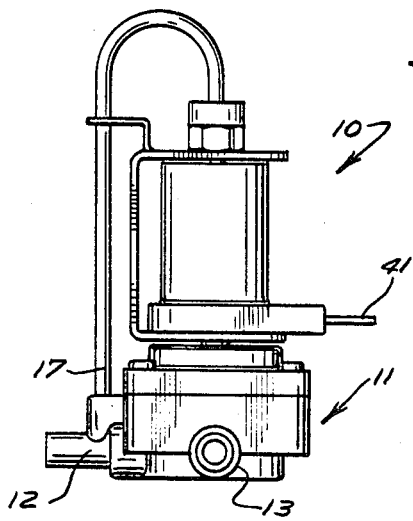
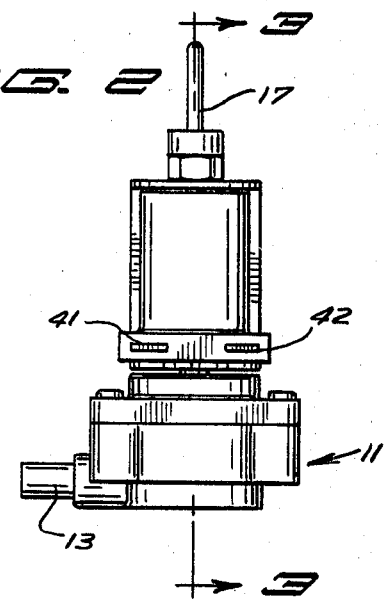
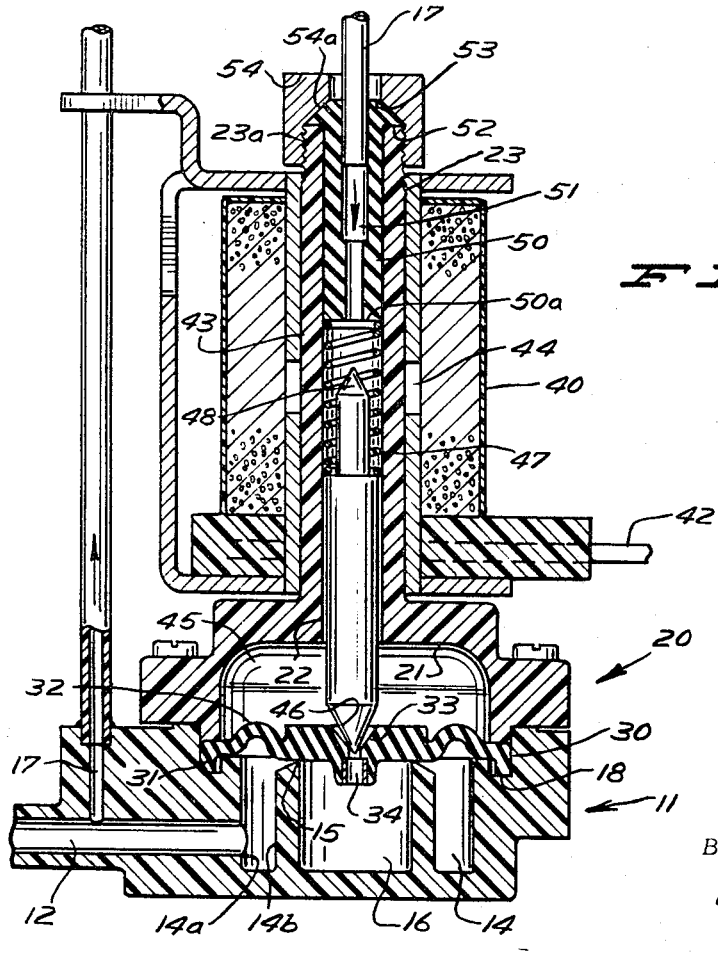
INVENTOR.
ROBERT E. ROBARGE
BY
Adams & Cuayna
ATTORNEYS

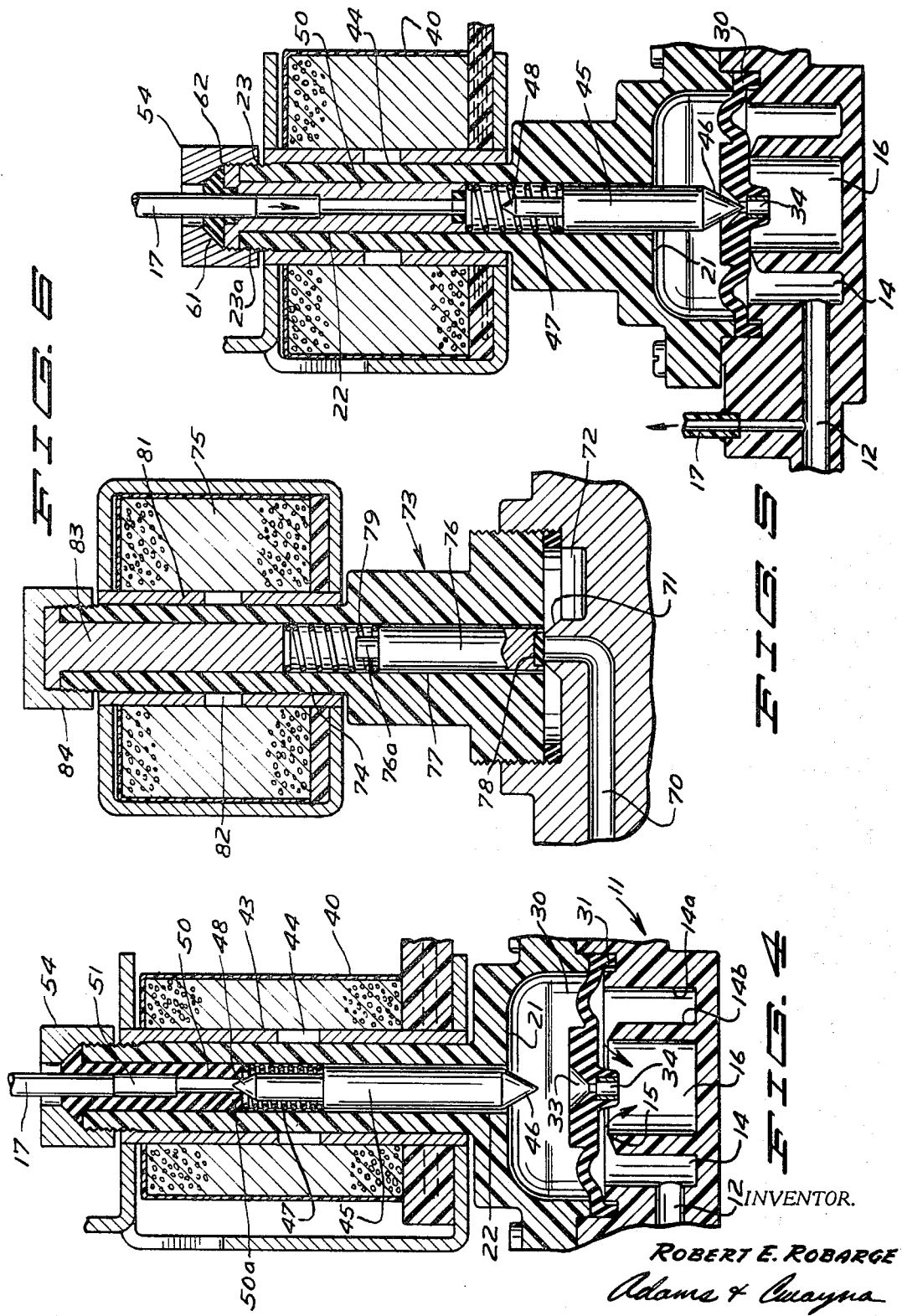

United States Patent Office 3,412,970
Patented Nov. 26, 1968

3,412,970
RESILIENT INSERT PILOT SEAT AND
CONNECTOR
Robert E. Robarge, Minneapolis, Minn., assignor to
North American Plastics, Edina, Minn., a corporation of Minnesota
Filed May 16, 1966, Ser. No. 550,538
5 Claims. (Cl. 251—30)

ABSTRACT OF THE DISCLOSURE

This invention relates to an improvement in solenoid valve devices and includes the concept in a preferred form of utilizing the pressure of the controlled fluid to assist in closing the valve and to maintain the same in a closed position. The valve includes a diaphragm type solenoid valve having the plunger mounted above the diaphragm with means to provide pressure to the rear of the diaphragm to seal the same against a seat. The valve includes a conduit to permit flow from the ordinary inlet of the valve to a location behind a diaphragm and the ordinary solenoid plunger incorporated in such a system includes a double ended valving member which will control the fluid through this pressure inlet conduit and will also assist in closing the diaphragm to the valve seat. As an added feature the valve incorporates an insert which provides means for introducing this inlet conduit into the valve member such that the insert will capture this conduit and provide a seat on the other end thereof for controlling flow through the conduit. In a modification of this form the insert is made of a magnetizable material arranged in the flux field of the ordinary energizing coil such that this insert will be magnetized and a direct magnetic force will be supplied to the valve member for positioning thereof. This direct force is more positive in effect than the ordinary provided flux field source of magnetism.

---

In the past various solenoid control valves have been provided which are designed to be placed in a flow conduit line and to control the flow of fluids therethrough. These valves are understood to be actuated by a magnetic coil structure surrounding at least selected portions of the valving housing which through the generation of a magnetic field control the position of a control valve member.

In the past certain solenoid controlled valves have been designed which include diaphragm shut offs and which valves are designed to utilize not only a spring closure pressure of a valving member but also utilize an additional fluid pressure against the diaphragm portion to positively insure closing of the valving seat. Upon opening these particular diaphragm structures fluid is allowed to drain from the rear side of the diaphragm through the diaphragm and upon release of such pressure therebehind the diaphragm is opened due to the application of inlet water force upon the front side thereof. Naturally in this opening position it is necessary to prevent flow of fluid to the rear side of the diaphragm and for this particular purpose it is necessary to positively seal any fluid flow inlets into the rear of the diaphragm. In order to most easily accomplish this situation the valving member of the valve must be capable of two way sealing to seal against both the diaphragm and any conduits allowing fluid pressure to enter behind the diaphragm.

It is therefore an object of applicant's invention to provide a unique valve unit designed for solenoid operation which includes a flow control portion and a flow bypass portion with the flow therethrough being directed to assist in positive positioning of the flow control portion and which also includes the utilization of a single operating valve member to alternately seal and close either flow control portion or the by-pass portion.

It is a further object of applicant's invention to provide an insertable unit for a solenoid controlled valve member which insert includes a sealing portion thereon to permit sealing thereof by the operative valve member of the valve.

It is a further object of applicant's invention to provide an insert for a solenoid liquid flow control valve which insert may be of a magnetizable material positioned within the flux field of the coil of the valve to become magnetized upon energization of said coil, to provide a direct magnetic force acting on the operative valving member to insure positive movement thereof.

These and other objects and advantages of this invention will more fully appear from the following description made in connection with the accompanying drawing, wherein like reference characters refer to the same or similar parts throughout the several views, and in which:

FIG. 1 is a side elevation of a solenoid valve unit embodying the concepts of applicant's invention;

FIG. 2 is an end view of the valve illustrated in FIG. 1;

FIG. 3 is a vertical section taken substantially along line 3—3 of FIG. 2 showing the operative portions of applicant's improved valve;

FIG. 4 is a view similar to FIG. 3 illustrating the valve in an open position;

FIG. 5 is a view similar to FIG. 3 illustrating a magnetizable insert in use with a diaphragm type valve;

FIG. 6 is a modified form of the valve in cross section illustrating a magnetizable insert therein.

In accordance with the accompanying drawings the solenoid valve housing generally designated 10 provided herein includes a lower housing member 11 insertable into a flow line and therefore having an inlet 12 and an outlet 13 affording connection to a line. Inlet 12 communicates to the center of the lower housing 11 to a toroidally formed passage 14. Passage 14 has an exterior surface 14a generally arcuate in shape and a second interior surface 14b spaced inwardly therefrom to provide an upstanding wall member within housing 11 having a seating portion 15a at the upper surface thereof.

Interiorly of this upstanding wall an outlet chamber 16 is provided and this chamber communicates with the outlet conduit 13. A by-pass flow line generally designated 17 is provided in communicating relation to inlet passage 12 and extends upwardly therefrom as will be discussed hereinafter.

An upper housing member generally designated 20 is provided in sealed overlying relationship to the housing 11 and is provided with a dome shaped cavity 21 therein which cavity 21 generally overlies the inlet passage 14 and the outlet chamber 16. A valve element receiving passage and flow conduit 22 is provided longitudinally through a barrel portion 23 of housing 20 in generally vertical relation to the domed chamber 21 of housing 20. Barrel member 23 is provided with a threaded end portion 23a on the uppermost end thereof to receive certain elements therein.

When the solenoid valve embodying the concepts of applicant's invention is constructed as a diaphragm valve the valve must essentially include a closure diaphragm generally designated 30. This diaphragm 30 includes a substantially disc shape member received in overlying relationship to the inlet passage 14 and outlet cavity 16 of the lower housing 11 and is in underlying relationship to the domed cavity 21 of the upper housing 20 so as to provide a barrier therebetween. In the form shown the diaphgram member 30 is provided with a peripheral flange 31 around the exterior thereof to be received into an arcuate groove 18 formed in the lower housing 11 for positive positioning thereof. The diaphragm member 30 includes a substantially flexible portion 32 in spaced relation from flange 31 to permit oscillation of the entire diaphragm within the domed cavity 21. The interior portion of the diaphragm 30 is provided with a first sealing seat 33 generally cone shaped in configuration and a communicating passage 34 which passage 34 allows communication between the domed chamber 21 and the outlet chamber 16.

As with standard solenoid valves, a coil member 40 is provided in surrounding relation to the barrel section 23 of the valve 10 and electrical connections 41–42 are provided for energization of the coil 40. The coil frame 43 is provided with a gap portion 44 along the barrel section 23 of housing 20 to establish the flux density field for the unit when the same is energized. Again as standard features of a solenoid valve an operative valve member 45 is provided in sliding relation within passage 22 to be controlled by coil 40 and the lower end 46 thereof is in the form shown tapered to provide a sealing fit with the tapered opening 33 in diaphragm 30. A spring member 47 is provided upwardly of the valve member 45 within passage 22 to provide a downward closure force for the valve member 45 to normally urge the same downwardly into sealing relation with the tapered surface 33. A second sealing surface 48 is provided on the uppermost end of valve member 45 and in the form shown this surface is also conical in form.

In applicant's first and preferred form a removable insert member 50 is provided within the uppermost portion of longitudinal passage of 22 and in the form shown this insert 50 is of a substantially resilient material to provide a seat 50a on the lower end thereof in sealing relation to the uppermost end 48 of the valving member 45 when the valve 45 is in its uppermost position. A passage 51 is provided longitudinally through insert 50 to permit the by-pass conduit 17 to deliver fluid therethrough to cavity 21. The uppermost portion of insert 50 is in the form shown of frusto-conical shape to provide a first shoulder 52 to abut with the uppermost portion of the barrel section 23 and a tapered surface extending upwardly therefrom to a top reduced section 53. A capturing element 54 is designed with an internal tapered surface 54a to agree with the tapered exterior surface of the insert 50 and which capturing element 54 is provided with threads thereon to permit threaded connection with barrel 23. It should be obvious that when the capturing element 54 is tightened on such threads the material of the insert 50 will deform to positively hold the conduit 17 within passage 51 and to also provide a seal between the shoulder 52 and the top of the barrel section 23.

In operation of the valve it should be obvious that the normal fluid flow through conduits 12–13 is that flow illustrated by the arrows in FIG. 4 where the diaphragm member 30 has been displaced upwardly from seat 15 to permit direct communication between inlet passage 14 and outlet chamber 16. In this position it should be particularly noted that the upper sealing seat 48 of the operative valving member 45 is in sealing position against insert 50 so that the normal flow of water through by-pass conduit 17 is definitely not permitted to enter the domed chamber 21 behind diaphragm 30. In this position it should also be obvious that the coil has been energized to draw the operative valve member 45 upwardly. When it is desirable to close the valve 10 the coil 40 is de-energized and the spring member 47 will displace the valve element 45 downwardly thus unseating the upper seal portion 48 thereof from the seat 50a of insert 50. Likewise this downward displacement positions the bottom sealing end 46 thereof in direct sealing position to a tapered seat 33 of diaphragm 30. In this valve element 45 shifting position closure of diaphragm 30 will not necessarily have been obtained due to the fact that the water pressure entering conduit 12 and passage 14 may be of sufficient force to overbalance the spring 47. Opening of conduit 17 does however permit inlet fluid to enter the by-pass conduit 17 and pass downwardly into the domed chamber 21 behind diaphragm 30. This fluid will not be able to escape from this chamber 21 due to the closure of seat 32 and passage 34 and will thereby build up pressure to overcome the pressure exerted by the inlet fluid on the bottom of diaphragm 30. The area of the chamber 21 is substantially larger than the inlet passage 14 and upon buildup of water pressure behind the diaphragm 30 the diaphragm 30 will be urged into closed position.

When it is necessary to open the valve the solenoid is again energized to bring the valve member 45 into the position illustrated in FIG. 4 where the inlet conduit 17 and passage 51 are sealed and the passage 34 through diaphragm 30 is open to permit relief of water pressure from behind diaphragm 30 by allowing water from domed chamber 21 to flow through outlet 16. Upon relief of such pressure the fluid inlet pressure against the front or diaphragm 30 will force the same upwardly.

In a modified form of the invention illustrated in FIG. 6 the structure is substantially the same as that discussed with the exception that the insert member 50 is of a magnetizable material and is properly placed in the main flux field of coil 40 and more particularly in close relation to the flux break 44 in the coil frame. This magnetizable insert 50 is provided with a lower seat 60 of resilient material to again provide a seat portion to be sealed by the uppermost tapered seating element 48 of valve member 45. The uppermost end of this magnetizable insert 50 is provided in overlapped abutting relationship to the uppermost surface of barrel 23 to properly govern the insertion thereof. A frusto-conical conduit capturing element, resilient in form, designated 61 is provided on the uppermost surface 62 of the magnetizable insert 50. This frusto-conical capturing element again is in compressible agreement with a capturing element 54 such that upon tightening of the capturing element 54 on the threads 23a of barrel 23 the resiliency of element 61 will permit the same to be positively drawn about conduit 17 for effectively capturing the conduit 17 therein. In this particular form it should be obvious that a seal may of necessity be placed about the periphery of insert 50 to seal between this particular surface and the interior surface of passage 22.

The operation of this particular modification is identical to that previously discussed except for the fact that the magnetizable insert being of the direct flux field of the coil 40 will become magnetized upon energization of the coil 40 and actually serve as a direct magnet for the magnetically attractable valving element 45. The magnetic force in this instance then becomes direct rather than purely a flux field system and thus provides a more efficient and effective magnetic pulling force for the moveable valve element 45 to positively insure proper movement of the valve element 45 within the housing passage 22. With this type of magnetizable insert it is necessary to provide a seal to close conduit 17 and the components thereof could be in the form illustrated or reversed to provide the resilient portion on valve member 45.

In still another modified form of the unit a different seating and flow control structure is illustrated for the lower housing portion 11. This particular form of solenoid valve is termed a positive seat valve in which no diaphragm closure system is utilized. Rather inlet conduit 12 communicates directly with the interior of a seat portion 71 and the outlet conduit 72 is formed arcuately therearound. The upper housing 73 of this form again includes a barrel portion 74 for mounting a coil structure 75 therearound with the operative valve element 76 being mounted within a pasasge 77 extending upwardly from the seat element 71 into the barrel portion 74. The valving element 76 in this particular form includes a lower resilient member 78 in direct overlying closing relationship to the seat 71 such that upon lifting thereof flow is permitted between the inlet 70 and outlet 72 and conversely upon closing thereof flow is positively stopped. A spring retaining shoulder 76a is provided on the uppermost end of the valving element 76 and a return spring 79 is provided therearound to positively insure that the valving portion 76 will be moved downwardly upon deenergization of the coil 75.

Coil frame 81 is provided with a flux gap 82 and directly in aligned relationship to the flux gap 82 a magnetizable insert 83 is provided within passage 77 of the housing member 73. This particular insertable unit again abuts with the upper surface of barrel 74 and a capturing element 84 is provided to hold the same therein.

The magnetizable insert disclosed herein again provides an efficient and effective magnetic force to control the movement of valving element 76 as discussed with regard to FIG. 5.

With this modification it would be possible to provide closing fluid pressure to the rear side of the valving member 76 but in this particular case a relief would have to be established for relieving the pressure from therebehind when it is desirable to open the valve seat 71.

It will, of course, be understood that various changes may be made in the form, details, arrangements and proportion of parts without departing from the scope of my invention, which generally stated consists in the matter set forth in the appended claims.

What I claim is:
1. A solenoid type liquid control valve including:
 (a) a housing defining a chamber therein;
 (b) a fluid flow inlet and a fluid flow outlet defined in said housing and communicating with said chamber;
 (c) a valve seat arranged to control flow between said inlet and outlet;
 (d) a diaphragm arranged in said chamber in closing relation to said seat and defining a pressure chamber therebehind in opposed relation to said seat;
 (e) a conduit communicating with said inlet and said pressure chamber for the introduction of fluid pressure thereto;
 (f) passage means in said diaphragm for the relief of fluid pressure from said pressure chamber;
 (g) magnetically responsive positionable valving means arranged to control flow of fluid through said diaphragm passage in one position and to control flow of fluid through said conduit in a second position;
 (h) an insert member arranged in said housing having a passage therethrough communicating from said conduit to said pressure chamber defining a valve seat at the end thereof adjacent said pressure chamber and including a substantially resilient portion on the other end thereof, said resilient portion surrounding and receiving the conduit inserted therein;
 (i) magnetic generating means supplying a magnetic positioning force to said valving means; and
 (j) means for compressing the resilient portion on the said end of said housing whereby said housing is sealed about said conduit.
2. The structure set forth in claim 1 wherein the valve seat portion of said insert member is formed of substantially resilient material.
3. The structure set forth in claim 1 wherein said positionable valving means includes a pair of spaced apart valve seating portions for respectively seating against said diaphragm passage and said insert member.
4. The structure set forth in claim 3 wherein the seating portion of said valve means arranged for seating against said insert comprises a resilient compressible member arranged to positively close said insert.
5. The structure set forth in claim 1 wherein said insert member is formed of magnetic material and is arranged within the field of magnetic force generation to respond to magnetic generating means as a direct force magnet to effectively control the position of said valving means.

References Cited

UNITED STATES PATENTS

| 2,624,585 | 1/1953 | Churchill et al. | 251—30 X |
| 2,830,743 | 4/1958 | Rimsha et al. | 251—139 X |
| 3,012,581 | 12/1961 | Wilson | 251—139 X |
| 3,172,637 | 3/1965 | Adams et al. | 251—139 X |
| 3,307,129 | 2/1967 | Mangiafico | 251—139 X |

FOREIGN PATENTS 639,126  4/1962  Italy.

ARNOLD ROSENTHAL, *Primary Examiner.*